T864018

DEFENSIVE PUBLICATION

UNITED STATES PATENT OFFICE

Published at the request of the applicant or owner in accordance with the Notice of Apr. 11, 1968, 849 O.G. 1221. Identification is by serial number of the application and the heading indicates the number of pages of specification, including claims, and of sheets of drawing contained in the application as originally filed. The file of this application is available to the public for inspection; reproduction may be purchased for 30 cents per sheet.

Applications published under the Defensive Publication Program have not been examined as to the merits of alleged invention. The Patent Office makes no assertion as to the novelty of the disclosed subject matter.

PUBLISHED JULY 29, 1969

864 O.G. 1406

793,560

APPARATUS AND METHOD FOR IMPROVING SOLID PHASE, FLUIDIZED BED POLYESTERIFICATION PROCESS

Kenneth T. Barkey and Douglas C. May, both of 1669 Lake Ave., Rochester, N.Y. 14650

Filed Jan. 23, 1969. Published July 29, 1969
Int. Cl. C08g *17/003*
U.S. Cl. 260—75
No Drawing. 10 Pages Specification

By providing supplementary mechanical agitation (in addition to the agitation supplied by the fluidizing gas) directly to the solid particles of polyester suspended in a hot fluidizing gas stream during the polyesterification step, significantly better uniformity of product, rate of reactivity, and temperature response can be obtained.